Oct. 16, 1951  E. W. BRIDGE  2,571,531
VEGETABLE TRIMMING MACHINE
Filed Sept. 29, 1948  2 SHEETS—SHEET 1
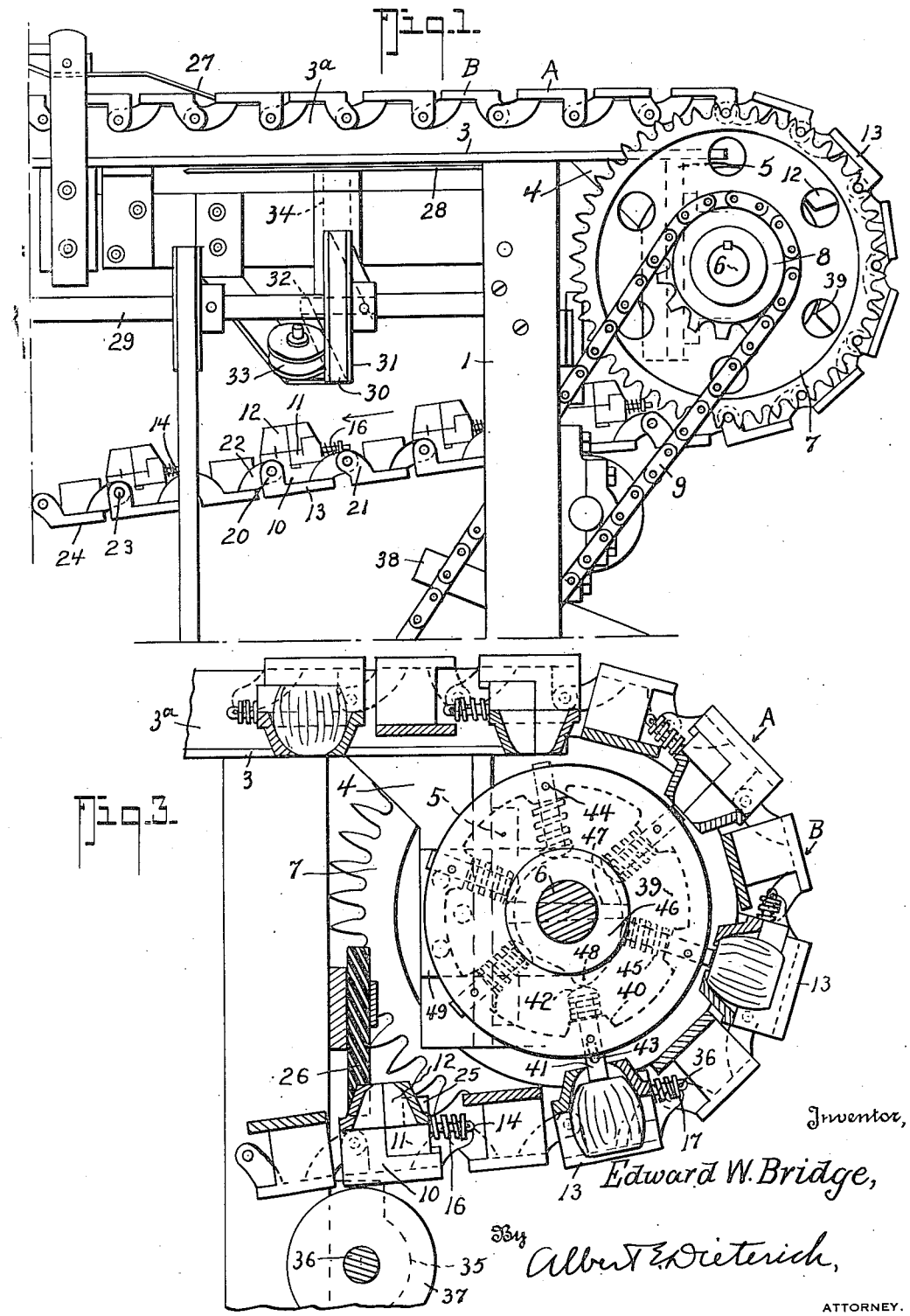
Inventor,
Edward W. Bridge,
By Albert E. Dieterich,
ATTORNEY.

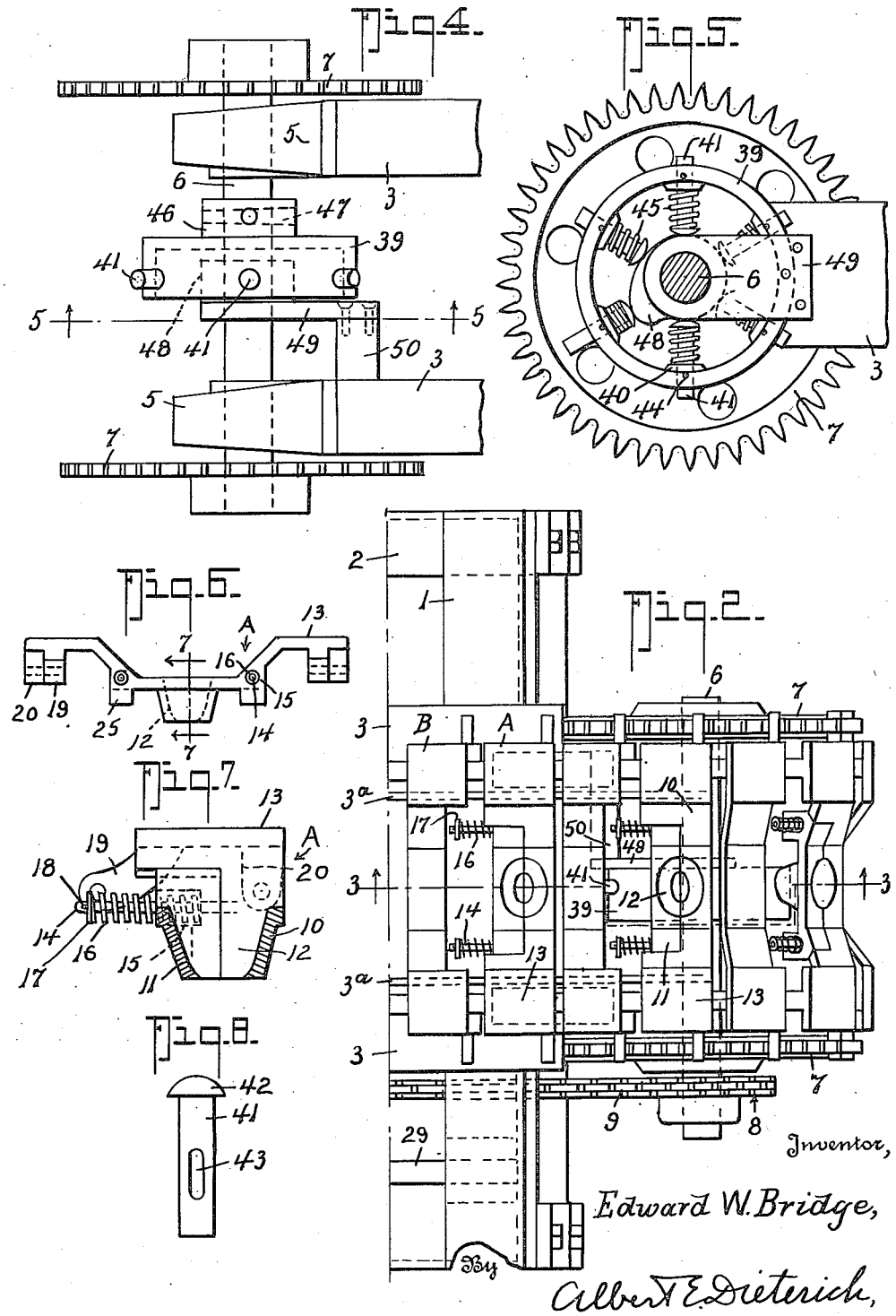

Patented Oct. 16, 1951

2,571,531

UNITED STATES PATENT OFFICE 2,571,531

VEGETABLE TRIMMING MACHINE

Edward W. Bridge, Philadelphia, Pa.

Application September 29, 1948, Serial No. 51,660

5 Claims. (Cl. 146—83)

My invention is a machine for trimming both the root end and the stem end of vegetables such as onions, and it particularly has for its objects: to provide a motor driven machine of a simple inexpensive construction which has provisions for trimming both ends of the vegetables at the same time while the vegetable is travelling forwardly in an endless conveyor; to provide such a machine with split-pocket links, into the pockets of which the onions to be trimmed are placed and held against accidental removal; to provide such machine with links whose pockets are somewhat tapered and each of which has a small hole in its center to permit the stem of the vegetable when placed in the pocket to come through far enough below the bottom surface for a moving knife to trim the stem as close to the body of the vegetable as desired; to provide means for opening the pockets so that the trimmed onions may fall out at a predetermined location; and to provide means for loosening or ejecting onions which have been forced down too tightly in the pockets of the opening means to function properly.

Other objects will in part be obvious and in part will be pointed out hereinafter.

To the attainment of the aforesaid objects and ends, invention further resides in those novel details of construction, combination and arrangement of parts, all of which will hereinafter be first described in detail and will then be specifically pointed out in the appended claims, reference being had to the accompanying drawings, in which:

Fig. 1 is a side elevation of a portion of a machine embodying my invention.

Fig. 2 is a top plan view of a portion of the same.

Fig. 3 is an enlarged vertical longitudinal section on approximately the line 3—3 of Fig. 2.

Fig. 4 is a detail plan view showing the ejector mechanism.

Fig. 5 is a section on the line 5—5 of Fig. 4.

Fig. 6 is a front elevation of one of the split-pocket links.

Fig. 7 is one enlarged section of the same on the line 7—7 of Fig. 6.

Fig. 8 is a detail elevation of one of the ejector pins.

In the drawing is shown a portion of an onion trimming machine that comprises the subject matter of an application filed by me on February 19, 1947, Serial No. 729,506, now Patent No. 2,491,950 granted December 20, 1949. That machine includes inverted angle iron standards 1, angle iron tracks 3, longitudinal base irons 2 connecting the standards 1 together and comprising with the standards and tracks 3, a rigid supporting frame. Brackets 4, mounted on the underside of the tracks 3, carry shaft bearings 5 for the shaft 6 on which sprocket wheels 7 are mounted.

A drive sprocket 8 on one shaft 6 receives its power through a chain drive 9 from a suitable motor (not shown).

Mounted on the sprockets 7 is a conveyor consisting of an endless succession of links of split or divided pocket links A and plain spacing links B. Each link A comprises two sections 10, 11, the latter being movable toward and from the other to close and open the pockets 12. Each link, as best shown in Fig. 6 has elevated ends 13 which ride on the upstanding portions 3ᵃ of the tracks 3. The movable section 11 of a link slides along pins 14 that are secured in holes in the link section 10 in any suitable way. Surrounding the pins in link section 10 are counterbores 15 to receive springs 16 which bear against washers 17 held at the outer ends of the pins 14 by cotter pins 18. Each section 10 has a pair of lugs 19 and 20 that connect with mating lugs 22 and 21 respectively of adjacent spacer links B. Hinge pins 23 connect the respective lugs 19, 21 and 20, 22.

The sectional links have pockets 12 with large openings at the top and smaller openings at the bottom (see Fig. 7). Each link B has elevated ends 24 to ride on the track portions 3ᵃ.

Each link section 11 on its underside is provided with lugs 25 through the medium of which the link sections are separated to discharge or drop the product. This is accomplished by the engagement of the lugs 25 with yieldable fingers 26 designed to yield when sections 11 shall have been opened to their maximum distance.

A topping knife 27 and a circular or rotary knife 28 serve to trim the onion at each end. The knife 27 in the machine of my co-pending application is an oscillating blade suitably operated from the same driven shaft 29 which drives the rotary knife 28 via a belt and pulley drive 30, 31, 32, 33 and shaft 34.

Secured to the uprights 1 at the discharge end of the machine are bearings 35 for a shaft 36 carrying rollers 37 on which the top faces of the raised portions 13 and 24, when inverted, ride. The rollers 37 are so located with respect to the fingers 26 that the split links ride the rollers at the same time that the fingers function and thus prevent sagging of the conveyor. The released products are dropped onto a chute 38.

In the operation of the machine an attendant pushes the untrimmed onions in the link pockets which then are carried past the trimming knives and trimmed. As a link with a trimmed onion comes over roller 37 the lugs 25 will back against the tension of the springs 16 to separate the sections sufficiently to release the onion and permit it to fall out onto a chute 38.

All the foregoing structure is known (see my application aforesaid) and per se is not of my present invention.

In the machine of my application aforesaid, it sometimes happens that the operator will force an onion into a pocket so far that the fingers 26 cannot overcome the tension of the springs 16 and the onion fails to fall out. It is to overcome this objectional feature that the present invention has been consummated.

My present invention resides in combining with the machine of my application aforesaid, a means to loosen the onion in the pocket or entirely eject it just before it arrives at the place where the fingers 26 operate. To this end I mount on shaft 6, a drum 39 which has a hub 46, keyed to the shaft as at 47. Mounted radially in bosses 40 in the rim of the drum are push pins 41 having slots 43 (Fig. 8) through which pins 44, in the drum, pass. The pins have rounded heads 42 which engage a suitably shaped cam 48 freely mounted on the shaft 6 within the drum 39 and having an arm 49 secured to a bracket 50 mounted on one of the shaft brackets 5 or other fixed part of the machine so as to hold the cam 48 against turning. Springs 45 serve to retract the pins 41.

As best shown in Fig. 3 should an onion be so tightly forced into a pocket that fingers 26 could not free it a plunger or pin 41 will be pushed through the smaller opening of the pocket and loosen the onion in the pocket so that the fingers 26 will thereafter be able to function properly to release the onion from its pocket.

From the foregoing description taken in connection with the accompanying drawing it is thought the construction, operation and advantages of my invention will be clear to those skilled in the art.

What I claim is:

1. In a vegetable trimming machine, in combination an endless conveyor composed of transverse links pivotally connected together and passing around spaced sprockets, at least one of said links being constructed of two parts with a pocket between and in said parts to receive a vegetable to be trimmed, means mounting one of said two parts on the other part, means to press said two parts toward one another to effect a holding action on the vegetable, said pocket having a top opening and a bottom opening for the projection of the root end and stem of the vegetable therethrough respectively, means to trim the root end and sever the stem as the said link arrives at a predetermined place, means to move said two parts relatively apart at a predetermined discharge place to discharge the vegetable, means to operate said conveyor, said trimming and severing means, and means to initially move the vegetable outwardly of the pocket while resiliently retaining the vegetable within the pocket before the pocket reaches the discharge place of the machine and before the means to move said two parts relatively apart comes into operation, by virtue of all of which the vegetable will, after being loosened in the pocket, be retained in the pocket until the discharge place is reached.

2. In a machine for trimming vegetables, in combination an endless conveyor composed of transverse links pivotally connected together and passing around sprockets spaced apart on shafts, means for driving one of said shafts, alternate ones of said links being constructed of two parts with a pocket between and in said parts for receiving a vegetable to be trimmed, means mounting one of said parts on the other part, yieldable means continuously tending to press said two parts together to effect a holding action on the vegetable, said pocket having a top opening and a bottom opening, means to trim the vegetable as the pocket and vegetable reach a trimming station, means to separate said two parts as the pocket and vegetable arrive at a discharge station and means to initially move the vegetable outwardly of the pocket while resiliently retaining the vegetable within the pocket before the same reaches the discharge station.

3. In a vegetable trimming machine, an endless conveyor composed of transverse links pivotally connected together and passing around spaced sprockets, at least one of said links being constructed of two parts with a pocket between and in said parts to receive a vegetable to be trimmed, means mounting one of said two parts on the other part, means to press said two parts toward one another to effect a holding action on the vegetable, said pocket having a top opening and a bottom opening for the projection of the root end and stem of the vegetable therethrough respectively, means to trim the root end and sever the stem as the said link arrives at a predetermined place, means to move said two parts relatively apart at a predetermined discharge place to discharge the vegetable, means to operate said conveyor, said trimming and severing means, and means to initially move the vegetable outwardly of the pocket while resiliently retaining the vegetable within the pocket before the pocket reaches the discharge place of the machine and before the means to move said two parts relatively apart comes into operation; by virtue of all of which the vegetable will, after being initially moved in the pocket, be retained in the pocket until the discharge place is reached.

4. In a machine for trimming vegetables, an endless conveyor composed of transverse links pivotally connected together and passing around sprockets spaced apart on shafts, means for driving one of said shafts, alternate ones of said links being constructed of two parts with a pocket between and in said parts for receiving a vegetable to be trimmed, means mounting one of said parts on the other part, yieldable means continuously tending to press said two parts together to effect a holding action on the vegetable, said pocket having a top opening and a bottom opening, means to trim the vegetable as the pocket and vegetable reach a trimming station, means to separate said two parts as the pocket and vegetable arrive at a discharge station, means to loosen the vegetable while it remains in the pocket before the same reaches the discharge station, said loosening means including a drum securely mounted on one of said shafts and having radially projectable pins positioned for entering the bottom opening of said pockets as the links pass around the adjacent sprockets, and means secured to a stationary part of the machine for effecting the projection of said pins, and springs on the pins for returning them to retracted positions.

5. In a vegetable trimming machine, in combination, an endless conveyor having vegetable receiving pockets including two parts having means for urging said parts toward each other for retaining a vegetable in each pocket, means at one place to trim the vegetables in the pockets as the conveyor brings the vegetables to that place, means to initially move the vegetables outwardly of the pockets while resiliently retaining the vegetables within the pockets subsequent to the trimming of the vegetables, and means for separating said pockets parts for discharging the vegetables from the conveyor.

EDWARD W. BRIDGE.

REFERENCES CITED

The following references are of record in the file of this patent:

UNITED STATES PATENTS

| Number | Name | Date |
| --- | --- | --- |
| 1,995,694 | Urschel | Mar. 26, 1935 |
| 2,092,763 | Frank | Sept. 14, 1937 |
| 2,124,423 | Ladewig | July 19, 1938 |
| 2,158,977 | Douthitt | May 16, 1939 |
| 2,302,499 | Lacson | Nov. 17, 1942 |
| 2,308,038 | Ashlock | Jan. 12, 1943 |
| 2,343,496 | Carroll | Mar. 7, 1944 |
| 2,491,950 | Bridge | Dec. 20, 1949 |